June 5, 1934.　　　M. W. MORGAN　　　1,961,426
FLEXIBLE SHAFT COUPLING
Filed Aug. 21, 1930

Inventor
Merton W. Morgan,
By
His Attorneys

Patented June 5, 1934

1,961,426

UNITED STATES PATENT OFFICE 1,961,426

FLEXIBLE SHAFT COUPLING

Merton W. Morgan, Baltimore, Md., assignor to Poole Engineering and Machine Company, Baltimore, Md., a corporation of Maryland Application August 21, 1930, Serial No. 476,915

7 Claims. (Cl. 192—67)

This invention relates to improvements in flexible shaft couplings. The primary object of the invention is to provide a free floating gear tooth type of flexible coupling, so constructed that one shaft may be readily disengaged from the other.

More particularly, the invention seeks to provide a flexible shaft coupling wherein rotary motion is transmitted from one shaft to the other by an encircling member or sleeve but, in disengaging the two shafts this sleeve remains stationary. This feature of having the encircling member remain stationary is effected by having the hub on one of the connected shafts made sectional, one of the hub sections constituting a sleeve that is locked to the hub so as to rotate therewith but which is free to be moved axially of the hub to disengage the shafts.

A still further object is to provide means that will be operative when the shafts are disconnected for supporting the encircling member concentrically on the driven shaft so that the continued rotation of the driving shaft will not cause any vibration of the encircling member.

With these and other objects in view the invention consists in certain details of construction and combinations and arrangements of parts all as will hereinafter be more fully described and the novel features thereof particularly pointed out in the appended claims.

Figures 1, 2:
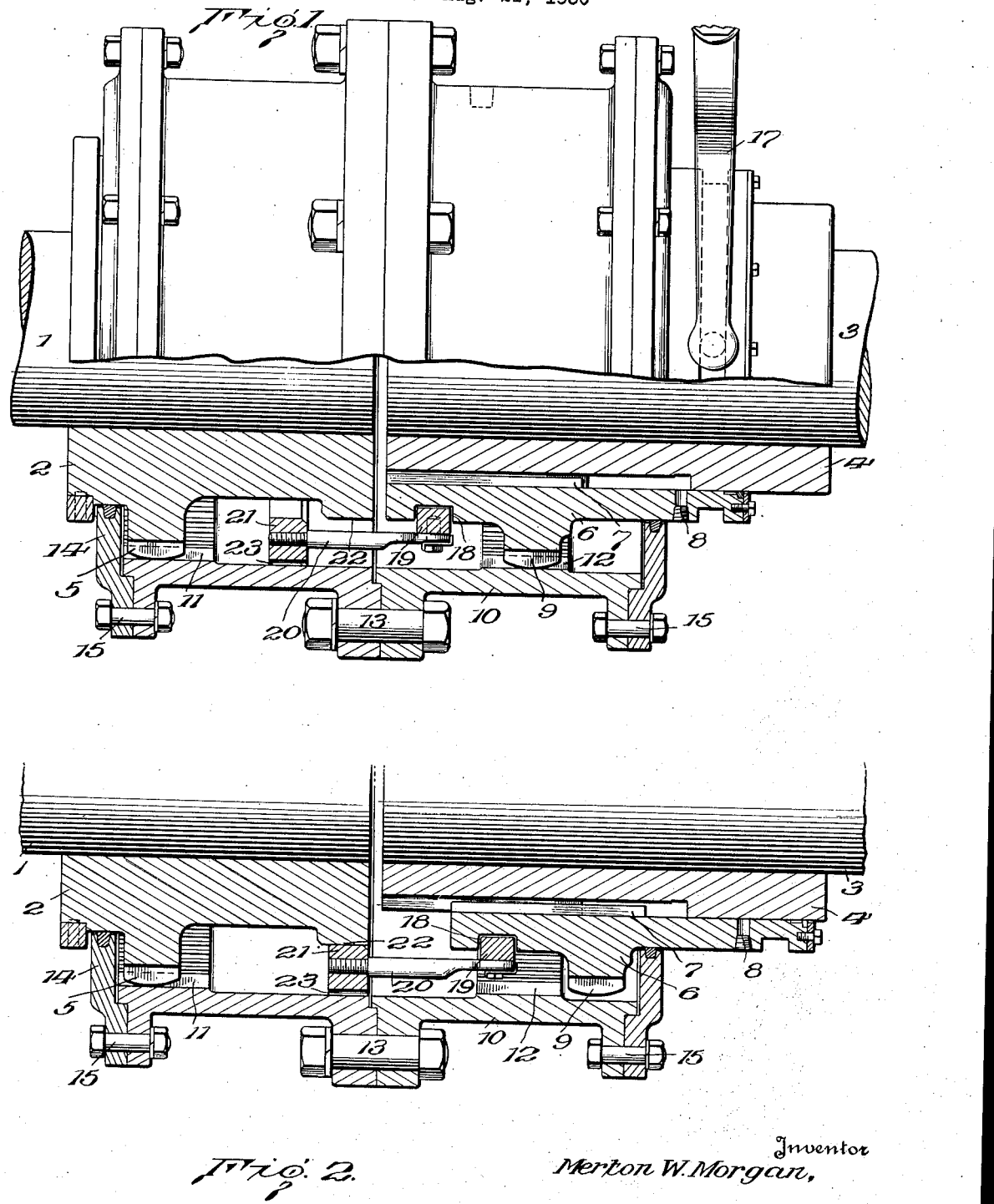
Figure 1 is a view taken longitudinally of the two connected shafts, a portion of the structure being shown in elevation and a portion in section.
Fig. 2 is a similar view but showing the shafts disconnected.

Referring to the drawing, the driven shaft 1 has a hub 2 thereon and the driving shaft 3 has a hub 4 thereon. Formed on the hub 2 is an annular series of teeth 5, but hub 4, which might be termed the sectional hub, has thereon a sleeve-like element 6 which is splined to the hub section 4, as indicated at 7. The splines 7 lock the sleeve 6 for rotation with the hub but the recesses in which said splines engage are of sufficient length as to permit the sleeve to be moved axially of shaft 3. For lubricating the splines 7 sleeve 6 is formed with a grease hole 8. On its exterior surface sleeve 6 is formed with teeth 9 and encircling or surrounding the two shaft ends there is a sleeve 10 on the interior of which there are formed annular series of teeth 11 and 12, the teeth 11 being engaged by the teeth 5 of hub 2 and the teeth 12 being engaged by the teeth 9 on sleeve 6, whereby rotary motion of the driving shaft 3 will be transmitted by encircling member 10 to the driven shaft 1. The encircling member or sleeve 10 may take any of numerous forms but, in the present instance, it is illustrated as consisting of two sections secured together by bolts 13 and end plates 14 attached to the encircling member by bolts 15. It will be understood that this annular encircling member is filled with lubricant for lubricating the moving parts, the lubricant being retained by the end plates 14.

In Fig. 1 the sleeve 6 is in position to connect the shafts together but, as shown in Fig. 2, the sleeve may be moved to disengage teeth 9 from teeth 12 so that the driving shaft and the sleeve 6 can rotate without imparting rotary motion to the encircling member 10. Various instrumentalities might be utilized for effecting this axial shifting of sleeve 6 but, in the present instance, there is simply shown a yoke member 17 engaging in an annular recess in the sleeve 6, the yoke 17 being suitably connected to devices (not shown) for actuating the same to shift sleeve 6 in and out axially of shaft 3.

When the shafts are disconnected it is important that the encircling member 10 be incapable of being vibrated. To accomplish this, the present structure is so arranged that not only will the encircling member 10 be supported firmly on one of the shafts but, in the present instance, it is so supported on the driven shaft as distinguished from being supported on the driving shaft. As illustrated, sleeve 6 has adjacent its inner end an annular recess 18 in which there is secured a split ring member 19. Ring 19 might be described as being a floating ring and attached thereto by rods 20 is a second ring 21. When the shafts are coupled for rotation together, ring 21 occupies the position illustrated in Fig. 1, but when the shafts are disconnected ring 21 is moved to a position between the encircling member 10 and a supporting surface 22 on the hub 2, as shown in Fig. 2. In the construction shown this shifting of ring 21 is effected by the shifting of sleeve 6 on the hub 4. Ring 21 should be provided with one or more oil openings 23 to permit the flow of oil toward either side thereof.

With the construction disclosed the two shafts can be disconnected with considerably less effort than will be required if the entire encircling member had to be shifted for effecting the disconnection. Again, when the shafts are disconnected the encircling member is supported on the then stationary shaft and as it is supported concentrically thereon there is no tendency whatever for said member to vibrate or be affected in any wise by the continued rotation of the driving shaft.

What I claim is:

1. A flexible shaft coupling comprising a pair of shafts, a hub member on each shaft, an encircling member, cooperating teeth on said encircling member and one hub member, means interposed between said encircling member and the other hub member for transmitting rotary motion from one of said members to the other, said means being movable axially of the hub member to disconnect said members, and means comprising an axially movable element for supporting said encircling member concentrically on one of said hub members when said members are disconnected, said supporting means being inoperative when the shafts are connected.

2. A flexible shaft coupling comprising a pair of shafts, a pair of members on the shafts, an encircling member, means on said encircling member for transmitting rotary motion from one shaft member to the other, one of said shaft members having a section movable axially of the shaft to disconnect said encircling member, and means comprising an axially movable member for concentrically supporting the encircling member on one shaft member when disconnected, said supporting means being inoperative when the shafts are connected.

3. A flexible shaft coupling comprising a pair of shafts, a hub on each shaft, a sleeve splined on one hub, teeth on said sleeve and the other hub, an encircling member having teeth engaging the teeth on said sleeve and hub, said sleeve being movable axially of the shafts to disengage its teeth from the teeth on said member, and means comprising an axially movable member for supporting said member concentrically of one of said shafts when said teeth are disengaged, said supporting means being inoperative when the shafts are connected.

4. A flexible shaft coupling comprising a pair of shafts, a hub on each shaft, a sleeve on one hub rotatable therewith, teeth on said sleeve and the other hub, an encircling member, teeth on said member engageable with the teeth on said hub and sleeve, said sleeve being movable axially of its hub to disengage its teeth from said member, and means comprising an axially movable member for supporting said member concentrically on the other hub when said teeth are disengaged, said supporting means being inoperative when the shafts are connected.

5. A flexible shaft coupling comprising a pair of shafts, a hub on each shaft, a sleeve on one hub, a supporting surface on the other hub, teeth on said other hub and said sleeve, an encircling member, teeth on said member engaging the teeth on said other hub and sleeve, said sleeve being movable longitudinally of its hub to disengage the sleeve teeth from the encircling member teeth, and a supporting member connected to said sleeve adapted to be positioned between said supporting hub surface and the encircling member to support the latter concentrically of said hub when said teeth are disconnected.

6. A flexible shaft coupling comprising a pair of shafts, a hub on each shaft, a sleeve on one hub, a supporting surface on the other hub, teeth on said other hub and said sleeve, an encircling member, teeth on said member engaging the teeth on said other hub and sleeve, said sleeve being movable longitudinally of its hub to disengage the sleeve teeth from the encircling member teeth, and a floating ring member movable between said supporting surface and encircling member to support the latter concentrically on said hub when said teeth are disengaged.

7. A flexible shaft coupling comprising a pair of shafts, a hub on each shaft, a sleeve on one hub, a supporting surface on the other hub, teeth on said other hub and said sleeve, an encircling member, teeth on said member engaging the teeth on said other hub and sleeve, said sleeve being movable longitudinally of its hub to disengage the sleeve teeth from the encircling member teeth, a floating ring on said sleeve and a second floating ring connected to the other ring and movable between said supporting surface and encircling member to support the latter concentrically on said hub when said teeth are disengaged.

MERTON W. MORGAN.